United States Patent
Heaton et al.

(10) Patent No.: US 11,531,578 B1
(45) Date of Patent: Dec. 20, 2022

(54) PROFILING AND DEBUGGING FOR REMOTE NEURAL NETWORK EXECUTION

(71) Applicant: Amazon Technologies, Inc., Seattle, WA (US)

(72) Inventors: Richard John Heaton, San Jose, CA (US); Ilya Minkin, Los Altos, CA (US)

(73) Assignee: Amazon Technologies, Inc., Seattle, WA (US)

(*) Notice: Subject to any disclaimer, the term of this patent is extended or adjusted under 35 U.S.C. 154(b) by 1044 days.

(21) Appl. No.: 16/216,887

(22) Filed: Dec. 11, 2018

(51) Int. Cl.
*G06F 11/07* (2006.01)
*G06N 3/02* (2006.01)
*G06F 9/54* (2006.01)
*G06N 5/04* (2006.01)
*G06N 3/04* (2006.01)

(52) U.S. Cl.
CPC ............ *G06F 11/0748* (2013.01); *G06F 9/54* (2013.01); *G06F 11/0766* (2013.01); *G06F 11/0772* (2013.01); *G06F 11/0778* (2013.01); *G06N 3/02* (2013.01); *G06N 3/04* (2013.01); *G06N 5/04* (2013.01)

(58) Field of Classification Search
CPC ............ G06F 11/0778; G06F 11/3089; G06F 11/079; G06F 9/54; G06N 3/04; G06N 5/04
See application file for complete search history.

(56) References Cited

U.S. PATENT DOCUMENTS

| | | | |
|---|---|---|---|
| 2018/0307551 A1* | 10/2018 | Bacha | G06F 11/0766 |
| 2018/0336086 A1* | 11/2018 | Vaden | G06F 11/3089 |
| 2018/0357152 A1* | 12/2018 | Browne | G06F 11/3664 |
| 2019/0258535 A1* | 8/2019 | Morisse | G06F 11/0772 |
| 2019/0279086 A1* | 9/2019 | Nicol | G06N 3/04 |
| 2020/0133761 A1* | 4/2020 | Paruthi | G06F 11/0751 |

* cited by examiner

*Primary Examiner* — Jonathan D Gibson
(74) *Attorney, Agent, or Firm* — Weaver Austin Villeneuve & Sampson LLP

(57) ABSTRACT

Remote access for debugging or profiling a remotely executing neural network graph can be performed by a client using an in-band application programming interface (API). The client can provide indicator flags for debugging or profiling in an inference request sent to a remote server computer executing the neural network graph using the API. The remote server computer can collect metadata for debugging or profiling during the inference operation using the neural network graph and send it back to the client using the same API. Additionally, the metadata can be collected at various granularity levels also specified in the inference request.

23 Claims, 12 Drawing Sheets

US 11,531,578 B1

PROFILING AND DEBUGGING FOR REMOTE NEURAL NETWORK EXECUTION

BACKGROUND

An artificial neural network is generally a set of algorithms modeled loosely after the human brain, which can be used to recognize underlying relationships or patterns in input data through a process that mimics the way human brain operates. Neural networks have many applications such as speech recognition, search queries, image recognition, etc. The neural networks may be executed on remote server computers in the cloud.

BRIEF DESCRIPTION OF THE DRAWINGS

Various embodiments in accordance with the present disclosure will be described with reference to the drawings, in which.

DETAILED DESCRIPTION

Figure 1:
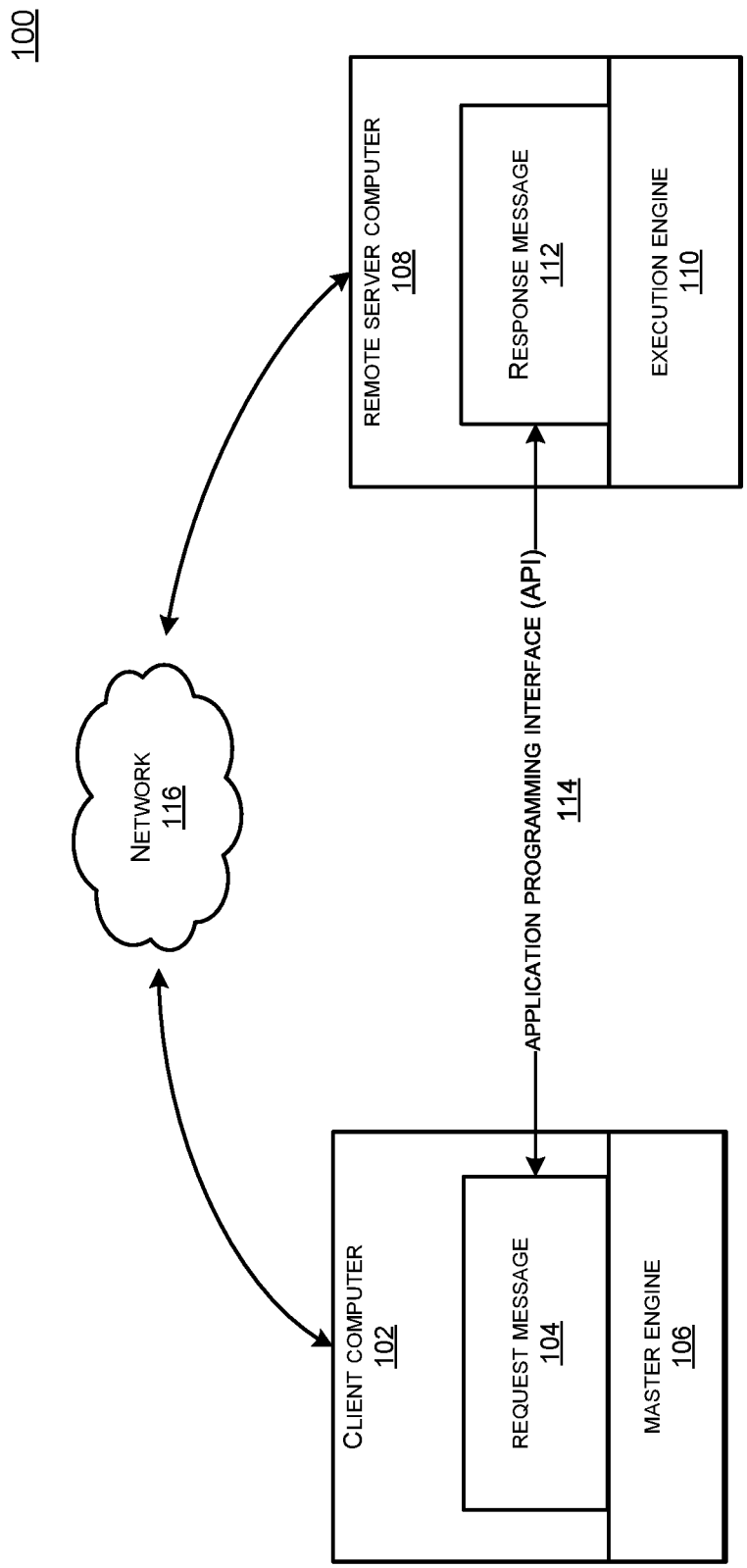
FIG. 1 illustrates an example distributed system for neural network processing.

Cloud service providers can provide computing and memory resources over a network for various services such as analytics, web services, storage, databases, cloud computing, application development, deployment service, etc. In some examples, the cloud service providers may include a plurality of server computers in a data centerto execute various artificial neural networks for different users to provide services including image recognition, audio processing, video processing, or text based queries, among other examples. An artificial neural network is generally a set of algorithms modeled loosely after the human brain, which can be used to recognize underlying relationships or patterns in an input data set through a process that mimics the way a human brain operates. The input data set may correspond to an image, a text, an audio, or a video that needs to be operated on. In some examples, a server computer may use a prediction model to make a prediction on an input data set. The prediction model may comprise a multi-layer neural network such as a deep neural network (DNN), a convolutional neural network (CNN), or another suitable neural network.

A neural network may include multiple processing nodes. Each processing node may receive an element of an input data set, and scale the element with a weight or a filter to indicate the element's degree of influence on the output. In some implementations, a neural network may be defined, built, and trained using a master engine on a client computer based on a desired application of the neural network or other suitable criteria. Neural networks can be trained, by adjusting the weights, to learn about how to perform a certain computing task.

In some examples, the neural networks may be executed on a remote server computer in the cloud. For example, the remote server computer may belong to a cloud service provider. A client may be executing on the client computer coupled to the remote server computer via a network, or in a virtual machine on the server computer. The client and the remote server computer can communicate with each other using an application programming interface (API). The client may include software to access a neural network graph executing on the remote server computer. The software may be in the form of a non-transitory computer readable medium storing a program that can be executed by a processor. The API may allow interactions with an end point based on certain specifications. In some examples, the end point can correspond to a Uniform Resource Locator (URL) of the resources accessed using the API. The client can send a request message to the remote server computer using the API, and the remote server computer can respond to the request message by sending a response message to the client using the API. In certain examples, a user of the client computer can choose to send an inference request for an input image using the API to the remote server computer. In some examples, "inference" may refer to the process of using a neural network model that has already been trained to make useful predictions. In various examples, the client can send an inference request using the API to enable the execution of the neural network graph on the remote server computer for different sets of input data and weights.

A neural network may be represented using a neural network graph comprising different types of operations to be performed on an input data set. In some implementations, each operation can be represented by a node in the graph and the result of one operation can feed another node thus forming a hierarchical tree. As an example, for a CNN, the operations may include convolution, pooling, activation, etc. The remote server computer may store compiled code for the neural network graph in memory. The compiled code may include machine level instructions (alternatively called "instructions") that can be executed by an execution engine on the remote server computer. For example, the execution engine may include a neural network processor. Each operation in the neural network graph can be expanded into one or more instructions to be executed by the neural network processor. As an example, a convolution operation may be expanded into multiple matrix multiplication instructions.

In some cases, profiling and debugging data may be needed to help tune or debug a particular neural network graph on a particular execution engine. Profiling may correspond to determining a speed of execution of various operations or steps of the neural network graph, any resource constraints, or any other relevant information associated with the execution of the neural network graph. Debugging may encompass some degree of profiling as well as the ability to set break points, single step, or determine intermediate results during the execution of the neural network graph.

In some implementations, out of band methods may be used to access information related to the debugging or profiling of neural networks executing on a remote execution engine due to the remote separation of the master engine executing on the client computer from the remote execution engine. For example, the out of band methods may include a separate interface or an additional API to gather the information. However, such out of band methods may add complexity to the system since the path taken for inference may be different than the path taken for profiling or debugging. Additionally, the profiling and debugging data collected using such out of band methods cannot be easily correlated back to the original neural network graph provided by the client computer, which may introduce additional complexity for the users.

Certain embodiments of the disclosed technologies can provide in-band annotation of profiling and debugging data for neural network execution using one or more indicators in a request message from the client. For example, the one or more indicators can be part of the inference request sent by the client to the remote execution engine using the API. A first indicator can be used to enable collection of metadata associated with the execution of the neural network graph for the inference operation, which can be used for debugging or profiling of the neural network graph. A second indicator may be used to indicate a granularity level for collecting the metadata. For example, a user can request to collect the metadata for debugging or profiling a portion of a neural network graph which may correspond to a particular convolution operation, from a first convolution operation until a first pooling operation, or the first ten operations, among other examples. In some examples, the inference request may include a third indicator to specify a location within the neural network graph for collecting the metadata. The collected metadata may include timestamps which can be used to determine the time delays or elapsed clock cycles for the execution of various steps in the neural network graph. For example, the remote server computer may store the timestamps associated with each instruction corresponding to one or more operations in the portion of the neural network graph based on the granularity level and location indicator provided in the request message.

The remote server computer may be further configured to annotate the collected metadata back into the original neural network graph to provide a one-to-one correspondence between the collected metadata and the portion of the neural network graph being profiled or debugged. The annotated data may be provided back to the client in a response message using the same API which was used to make the infer request. Thus, the embodiments can utilize the in-band API for requesting the profiling or debugging data at different granularity levels and locations within the neural network graph, and for the conveyance of the profiling or debugging data which can be represented in the same format as used to represent the neural network graph. The in-band conveyance of this data can reduce or minimize expansion of additional APIs relative to out-out-band methods, and can ensure a more consistent execution path from the master engine to the remote execution engine and back.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates a distributed system 100 for neural network processing. The distributed system 100 may comprise a client computer 102 configured to communicate with a remote server computer 108 over a network 116. In some examples, the remote server computer 108 may belong to a cloud service provider which provides cloud computing services to different clients.

The client computer 102 may comprise a master engine 106 configured to define, build, or train neural network graphs to be executed on the remote server computer 108. A neural network graph may correspond to an artificial neural network designed for a specific application. In some examples, a neural network graph may be represented as a hierarchical tree of nodes. Each node may correspond to an operation to be performed as sets of input data and weights propagate through multiple layers of the artificial neural network. The operations may include convolution, activation, pooling, normalization, or summation among other examples.

A convolutional neural network (CNN) is generally a feed-forward artificial neural network. The CNN may include a number of convolutional and subsampling layers optionally followed by one or more fully connected layers. In some instances, the CNN may be configured to transform an original input image layer by layer from original pixel values to a final class score. Each filter can be convolved (e.g., using a sliding window) across a width and height of the input image and respective dot products can be computed between the entries of the filter (e.g., weights) and the input pixels at a given position. In some examples, the input image and the filter values may be represented using respective matrices, and the dot products can be computed using matrix multiplication operations. As the filter is slid over the width and height of the input image, a two-dimensional feature map (e.g., activation map) may be produced that can provide responses of that filter at every spatial position. Each feature map may then be subsampled, typically with mean or max pooling, over contiguous regions. Based on the implementation, before or after the subsampling layer an additive bias and sigmoidal nonlinearity may be applied to each feature map. Activation maps may be stacked along the depth dimensions to produce output feature maps. The pooling layer may be used for down sampling operations along with spatial dimensions, e.g., width and height. The fully connected layer may be used to provide the final class score. Some examples of the CNNs may include ResNet, Inception, AlexNet, VGG, ResNeXt, etc.

In some cases, a neural network may be defined based on its application. As an example, some of the applications of the neural networks may include handwriting recognition, speech-to-text transcription, weather prediction, facial recognition, stock market forecasting, etc.

A definition of the neural network may include defining a number of layers for the neural network, shape of the tensors, size of the filters, type of activation functions to be used, type of pooling operations to be performed, a stride size, among other examples. A neural network graph based on the definition of the neural network may be built using the client computer 102 or by an external entity.

Training a neural network may include calibrating all of the "weights" by repeating forward propagation and back propagation steps through the layers of the neural network. In forward propagation, a set of weights may be applied to an input data set and an output may be calculated. For the first forward propagation, the set of weights may be selected randomly. In back propagation, a margin of error of the output may be measured and the weights may be adjusted accordingly to reduce the error. Neural networks may repeat both forward and back propagation until the weights are calibrated to accurately predict an output.

The client computer 102 may be configured to communicate with the remote server computer 108 over the network 116 using an application programming interface (API) 114. In some examples, a client executing on a processor (not shown) in the client computer 102 may communicate with the remote server computer 108 using the API 114. For example, the client may include software that, when executed by the processor, can cause the processor to access a neural network graph executing on the remote server computer 108. Accessing the neural network graph may include sending the request message 104 or receiving the response message 112. The software may be stored as a program in a non-transitory computer readable medium. The non-transitory computer readable medium may include an SRAM, a ROM, an EEPROM, a flash or any suitable memory configured to store programs which can be executed by a processor. In some other examples, the client may be executing in a virtual machine on a host processor in the remote server computer 108. The virtual machine may be allocated to the client by a hypervisor executing on the remote server computer 108. In some examples, the client may send a request message 104 to the remote server computer 108 using the API 114. The remote server computer 108 may include an API endpoint that conforms to certain specifications. For example, the API endpoint may include a URL indicating a location of the remote server computer 108 on the Internet. In various examples, a user can send the request message 104 using the API 114 to compile or load a neural network graph on the remote server computer 108, or send an inference request to the remote server computer 108 to make a prediction on an input image using the neural network graph executing on the remote server computer 108.

Compiling the neural network graph may include converting the operations of the neural network graph to machine level instructions which can be executed by an execution engine 110 on the remote server computer 108. For example, the execution engine 110 may include a neural network processor comprising a plurality of processing nodes. The neural network processor may be coupled the host processor using a peripheral component interconnect express interface or another suitable interface. In some implementations, a load request using the API 114 can load the compiled code for the neural network graph in a memory accessible by the execution engine 110. An infer request can be sent to the remote server computer 108 using the API 114 including an input data set corresponding to an image for the neural network graph to make a prediction on the image. The execution engine 110 may execute the compiled code for the neural network graph using the input data set and the weights, and the remote server computer 108 can make the prediction based on the execution results.

In certain embodiments, the request message 104 for an infer request may include indicators to enable collection of metadata during the execution of the infer operation by the execution engine 110, which can be used for debugging or profiling a portion of the neural network graph. For example, the metadata may be used to determine long paths, less-optimal designs, or locations in which the graph is being blocked by resource contention or exhaustion. The indicators can be part of the request message 104 sent by the client to the remote server computer 108 using the API 114. A first indicator can be used to enable collection of the metadata during the inference operation for debugging or profiling a portion of the neural network graph. A second indicator may be used to indicate a granularity level for collecting the metadata. A third indicator may be used to indicate a location in the neural network graph for collection of the metadata.

The remote server computer 108 may annotate the collected metadata back into the original neural network graph to provide a one-to-one correspondence between the collected metadata and the portion of the neural network graph being profiled or debugged. The annotated data may be provided back to the client in a response message 112 using the API 114. Thus, the embodiments can utilize the in-band API 114 for requesting the profiling or debugging data at different granularity levels and locations within the neural network graph, and for the conveyance of the profiling or debugging data which can be presented in the same format as used by the neural network graph. Annotating the metadata in the same format can provide the same view to the user as the original neural network graph, which can make the debugging easier for the user. The annotated data can be used to tune or make adjustments in the neural network graph. For example, based on the annotated data, weights or one or more operations in the neural network graph can be adjusted to improve the performance of the neural network graph.

Figure 2:
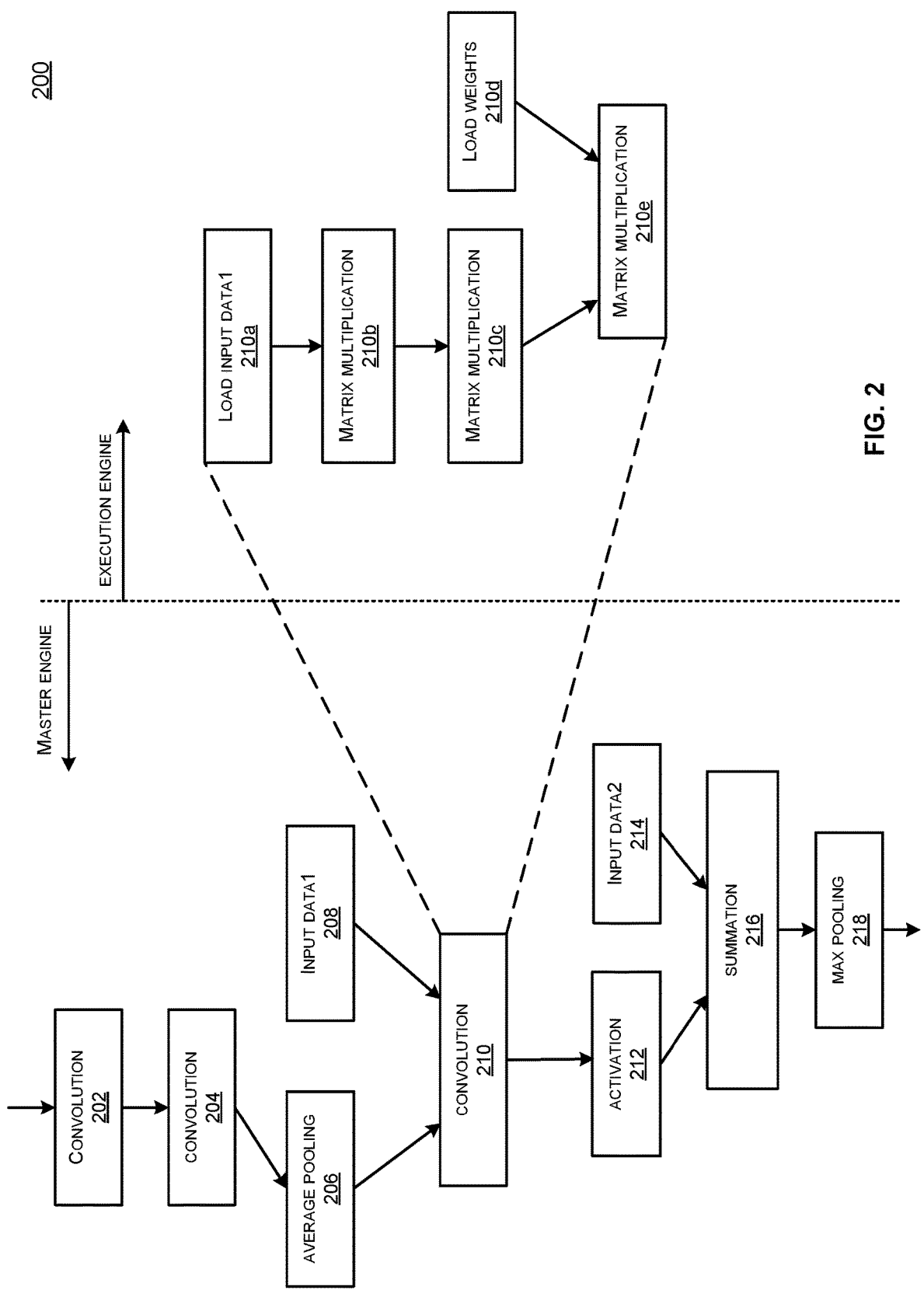
FIG. 2 illustrates an example neural network graph, in certain embodiments.

FIG. 2 illustrates an example neural network graph 200. The neural network graph 200 may be provided by the client computer 102 in FIG. 1. In some examples, the neural network graph 200 may include a portion of a larger neural network graph.

The neural network graph 200 may include a plurality of nodes corresponding to different operations. As an example, the neural network graph 200 may include a convolution operation 202. A result of the convolution operation 202 may be fed to another convolution operation 204. A result of the convolution operation 204 may be fed to an average pooling operation 206. A result of the average pooling operation 206, along with an input data1 208, may be fed to another convolution operation 210. A result of the convolution operation 210 may be fed to an activation operation 212. A result of the activation operation 212 may be added to an input data2 214 by a summation operation 216. A result of the summation operation 216 may be fed to a maximum pooling operation 218.

The neural network graph 200 may be compiled into machine level instructions. For example, as a result of the compilation, each of the operations 202-218 in the neural network graph 200 may be decomposed into respective machine level instructions that can be executed by the execution engine 110. As an example, FIG. 2 shows the convolution operation 210 decomposed into a load input data1 210a instruction, a matrix multiplication 210b instruction, another matrix multiplication 210c instruction, a load weights 210d instruction, and a matrix multiplication 210e instruction. Note that each of the operations 202-218 may be decomposed into their respective machine level instructions which are not shown in FIG. 2 for simplicity of illustration.

Figure 3:
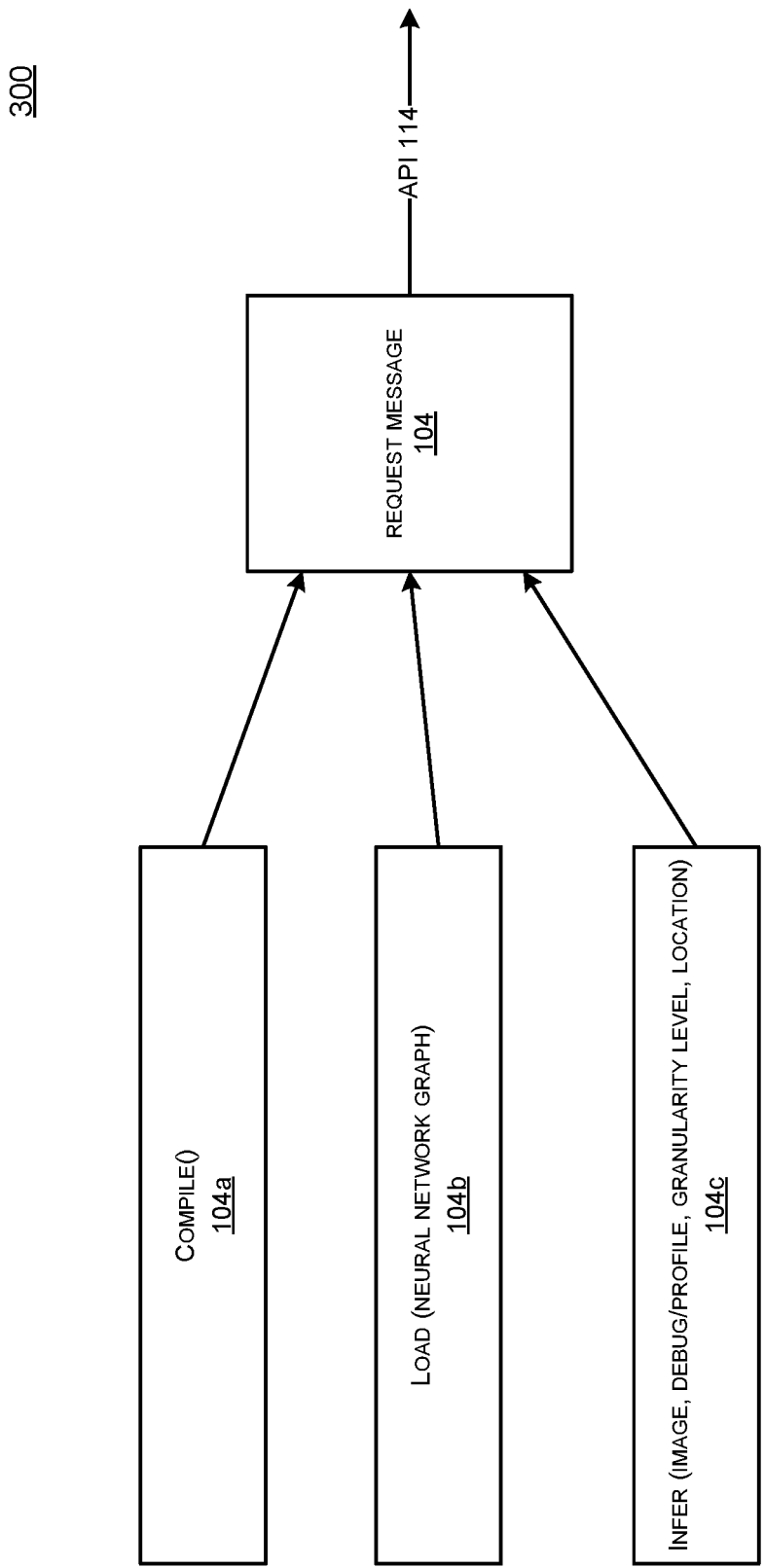
FIG. 3 illustrates various examples of a request message sent by a client computer to a remote server computer via an application programming interface (API), in certain embodiments.

FIG. 3 illustrates various examples of the request message 104 sent by the client to the remote server computer 108 using the API 114, in certain embodiments. For example, the API 114 may be used to request an operation to be executed using a neural network graph. The neural network graph may have been defined and created using the client computer 102 for a certain application. In some cases, tuning or debugging the neural network graph executing on the remote server computer 108 may be needed. Some embodiments of the disclosed technologies can allow access to the neural network graph executing on the remote server computer 108 using the API 114, which can allow debugging or profiling the neural network graph at different granularity levels.

The client may send the request message 104 to the remote server computer 108 using the API 114 to perform an operation on the neural network graph. The request message 104 may be sent by the client executing on the client computer 102 or in a virtual machine executing on the remote server computer 108. In some examples, the request message 104 may include a compile request 104a, a load request 104b, or an infer request 104c. The compile request 104a may be used to enable compilation of the neural network graph. The compile request 104a may convert various operations of the neural network graph into machine level instructions. For example, as discussed with reference to FIG. 2, the compile request 104a may convert each of the operations 202-218 of the neural network graph 200 into corresponding machine level instructions similar to the instructions 210a-210e. The compiled code comprising the machine level instructions may be executed by the execution engine 110. In one embodiment, the compile request 104a may generate the compiled code on the client computer 102, which can be loaded on the remote server computer 108 using the load request 104b. In another embodiment, the load request 104b can compile a selected neural network graph from a set of neural network graphs and load the corresponding compiled code on the remote server computer 108.

The infer request 104c may be used to request the remote server computer 108 to make a prediction on a given image using a neural network executing on the remote server computer 108. Note that the example shown in FIG. 3 uses an image for inference, but it will be understood that the inference can be requested for text, video, audio, search query, or any suitable object that can be inferenced using a neural network. Generally, the neural network may provide a result of the inference indicating a prediction for the image. For example, the result may indicate that the image is for a cat, a car, a person, or a house.

In some examples, debugging or profiling a portion of the neural network graph may be requested by a user, for example, to adjust or tune the weights used in the neural network computations. For example, it may be desirable to determine a speed of the execution for various operations represented in the graph, any resource constraints, or any other information as the neural network graph is executed on the remote server computer 108. In certain systems, additional APIs may be supplied to access such information. However, use of the additional APIs or other out-of-band methods may introduce additional complexity in the system. For example, debugging or profiling data provided using these methods may not have one-to-one correspondence with the operations represented in the neural network graph. Thus, in some cases, the debugging or profiling data may not be easily correlated back to the neural network graph, which can present a challenge to the users trying to debug the graph.

Embodiments of the disclosed technologies can provide in-band annotation of profiling and debugging data for neural network execution using the same API path as used to send load and infer requests to the remote server computer 108. For example, the API 114 may be used to convey a debugging or profiling request in the request message 104 for the infer request 104c, and debugging or profiling data may be received in the response message 112 from the remote server computer 108 using the API 114. In some embodiments, one or more indicators may be sent with the infer request 104c in the request message 104 to request the remote server computer 108 for providing debugging or profiling data at a given granularity level within a certain location in the neural network graph. As shown in FIG. 3, in some examples, a first indicator may be used to indicate a debug or profile request which can enable collection of metadata during the execution of the neutral network graph. A second indicator may be used to indicate a granularity level for collection of the metadata. A third indicator may be used to indicate a location for collection of the metadata in the neutral network graph. The one or more indicators may be provided in the infer request 104c by the user along with the image to be inferenced. The profiling request may be used to determine the speed of execution of various steps of the neural network graph, any resource constraints, or any other relevant information associated with execution of the neural network graph. The debugging request may be used to set break points, single step, or to determine intermediate results during the execution of the neural network graph.

The granularity level may be used to collect the debugging or profiling data at a high level of abstract graph nodes, low level of machine instructions, or various other levels of abstraction. Referring back to FIG. 2, granularity level may be set to request time delays for each of the operations 202-218, time delay for a particular operation (e.g., the convolution operation 204), time delays from the convolution operation 210 until the summation operation 216, time delays for each instruction for a particular operation (e.g., the instructions 210a-210e for the convolution operation 210), time delays for a particular type of operation (e.g., the convolution operations 202, 204, and 210), or time delay for the matrix multiplication 210c, among other examples. In some implementations, different granularity levels may be specified for different operations. The collected debugging or profiling metadata at various granularity levels can help identify long paths, less optimal designs of the graph, or places in which the graph is being blocked by resource contention or exhaustion.

In one embodiment, the one or more indicators to request profiling or debugging data can be part of the compiled code which is loaded on the execution engine 110. For example, the one or more indicators can be set to specific values to enable collection of metadata based on the granularity level when the infer request 104c is executed by the execution engine 110. In another embodiment, the one or more indicators can be interactively provided by the user with the infer request 104c once the graph is loaded on the remote server computer 108.

In some examples, the infer request 104c may be sent first using the API 114 for profiling the neural network graph 200. The profiling data received in the response message 112 may include time delays for each operation of the neural network graph 200. The user may identify a long path based on the profile data and send another infer request 104c for debugging a particular portion of the neural network graph 200 including the long path by providing the appropriate granularity level and the location indicators in the infer request 104c.

Figure 4:
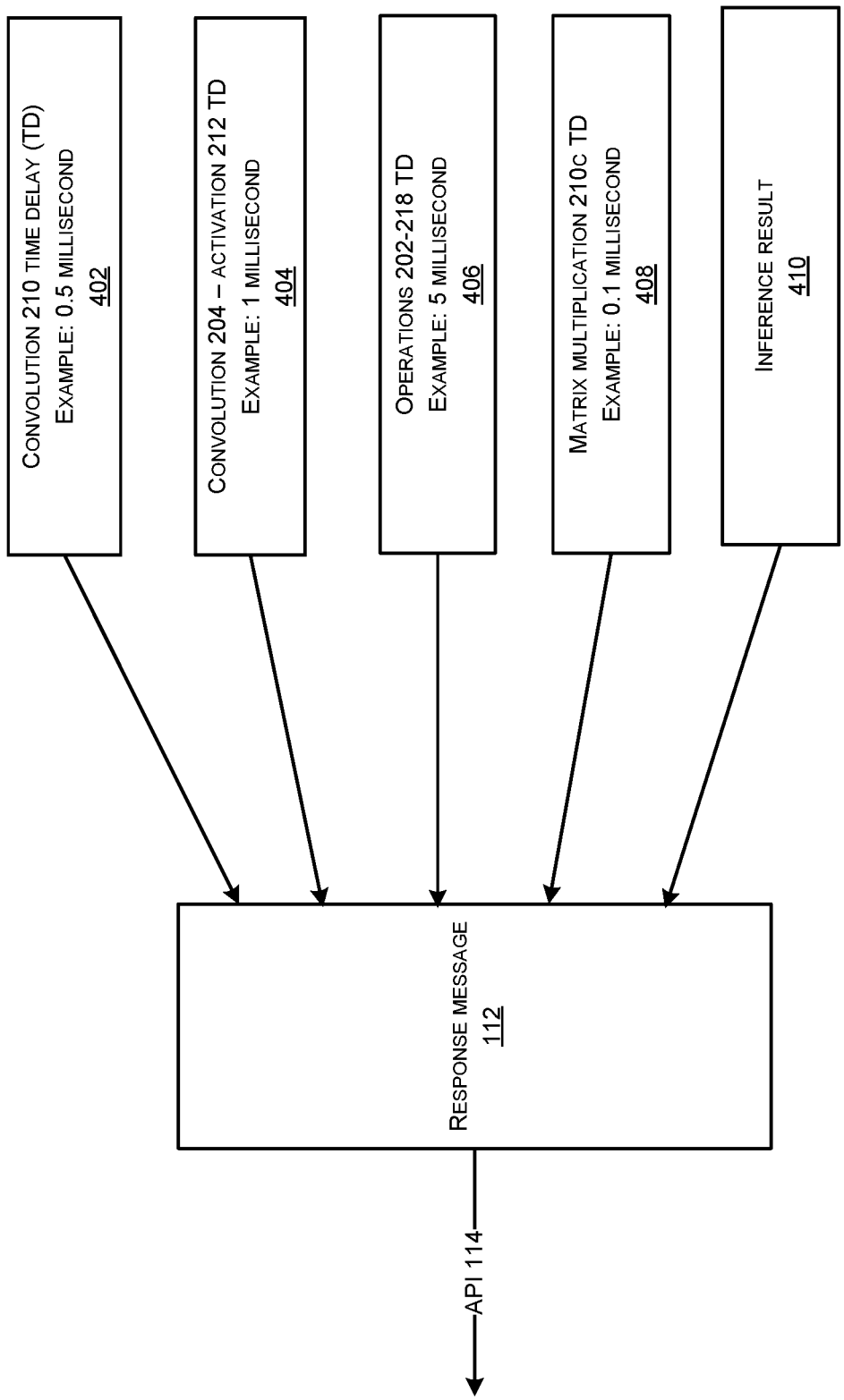
FIG. 4 illustrates various examples of a response message sent from the remote server computer to the client computer using the API, in certain embodiments.

FIG. 4 illustrates various examples 400 of the response message 112 sent from the remote server computer 108 to the client computer 102 using the API 114, in certain embodiments.

In some examples, the response message 112 may be provided by the remote server computer 108 to the infer request 104c using the API 114. The response message 112 may include an inference result 410 in addition to any metadata 402, 404, 406, or 408 collected during the execution of the inference operation based on the one or more indicators in the infer request 104c in FIG. 3. The metadata 402, 404, 406, or 408 may be generated using different granularity levels. As an example, the metadata 402 may include a time delay (TD) for the convolution operation 210 as 0.5 millisecond, the metadata 404 may include a time delay from the convolution operation 204 to the activation operation 212 as 1 millisecond, the metadata 406 may include a time delay for the operations 202-218 as 5 milliseconds, and the metadata 408 may include a time delay for the matrix multiplication instruction 210c as 0.1 millisecond. In one embodiment, the metadata for debugging or profiling may be annotated back into the neural network graph based on the granularity level, as shown in FIG. 5A and FIG. 5B.

Figure 5A:
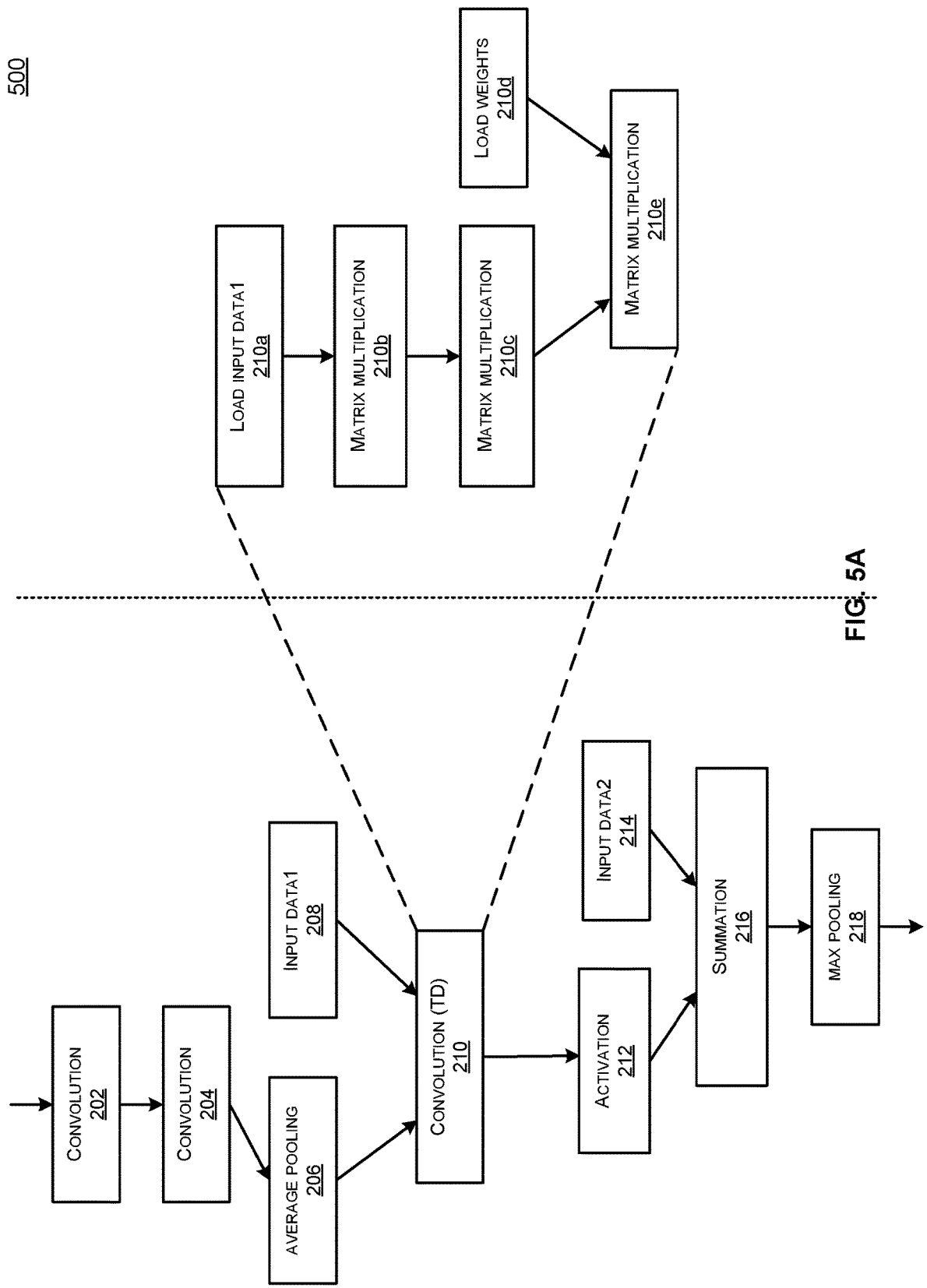
FIG. 5A illustrates an annotated neural network graph that includes a time delay for a convolution operation based on a first set of indicators in an infer request, in a first embodiment.
Figure 5B:
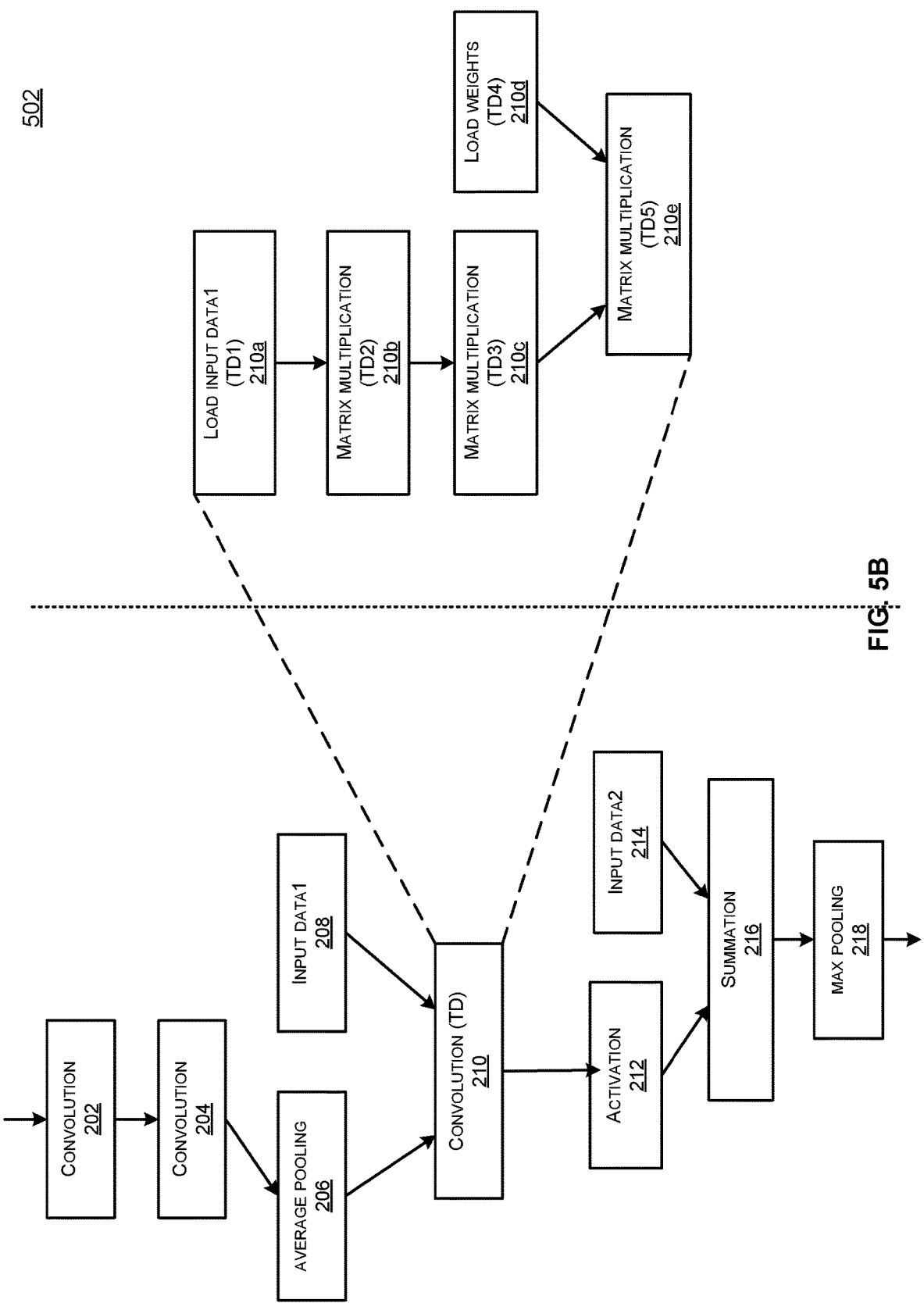
FIG. 5B illustrates an annotated neural network graph that includes respective time delays for instructions corresponding to the convolution operation based on a second set of indicators in the infer request, in a second embodiment.

FIG. 5A illustrates an example annotated neural network graph 500 that includes a time delay for the convolution operation 210 based on a first set of indicators in the infer request, in a first embodiment. For example, the annotated neural network graph 500 may include the metadata 402 for the convolution operation 210, as discussed with reference to FIG. 4. The annotated neural network graph 500 may be sent to the client along with the inference result 410 in the response message 112 using the API 114.

As shown in FIG. 5A, in some examples, the annotated neural network graph 500 may have the same view as the original neural network graph 200 provided to the remote server computer 200 for the infer request 104c. The annotated neural network graph 500 may include a time delay (TD) annotated for the convolution operation 210 based on the first set of indicators in the infer request 104c. The first set of indicators may include a first granularity level and a location indicator. The TD may be generated from the metadata 402 based on the first granularity level provided in the infer request 104c. Additionally, the location indicator provided in the infer request 104c may be used to locate the convolution operation 210 in the neural network graph 200 provided to the remote server computer 108. Thus, certain embodiments can provide the user a view of the annotated neural network graph which may be the same view as the original neural network graph, and can be easy to correlate for debugging or profiling purposes.

Thus, the first granularity level can be used to determine the time delay for the convolution operation 210 in the neural network graph 200. In some cases, the time delay for a particular operation may exceed a threshold and further debugging may be needed to determine delays for individual instructions corresponding to that operation. According to certain embodiments, the granularity level can be adjusted to determine the time delays for individual instructions corresponding to an operation, as discussed with reference to FIG. 5B.

FIG. 5B illustrates an example annotated neural network graph 502 that includes respective time delays for the instructions corresponding to the convolution operation 210 based on a second set of indicators in the infer request, in a second embodiment. For example, the annotated neural network graph 502 may include metadata for each instruction similar to the metadata 402, as discussed with reference to FIG. 4. The annotated neural network graph 502 may be sent to the client along with the inference result 410 in the response message 112 using the API 114.

The second set of indicators in the infer request 104c may include a second granularity level and a location indicator which can indicate to the remote server computer 108 that the metadata for each instruction corresponding to the convolution operation 210 has to be collected. In one example, the annotated neural network graph 502 may include a respective TD annotated for each instruction 210a-210e corresponding to the convolution operation 210 based on the second set of indicators. As shown in FIG. 5B, the instruction load input data1 210a may include a time delay TD1, the instruction matrix multiplication 210b may include a time delay TD2, the instruction matrix multiplication 210c may include a time delay TD3, the instruction load weights 210d may include a time delay TD4, and the instruction matrix multiplication 210e may include a time delay TD5. The time delays TD1, TD2, TD3, TD4, and TD5 for the instructions 210a-210e may add up to the TD for the convolution operation 210. Thus, by choosing the appropriate values for the granularity level in the infer request 104c, the user can determine time delays at a high level of operations as well as at a low level of building-block instructions or various other levels of abstraction for a neural network graph.

Thus, in some cases, the time delays provided in the response message 112 may be used to determine long paths, less-optimal designs, or locations in which the graph is being blocked by resource contention or exhaustion. In some examples, for debugging a long path through the neural network graph 200, the user can request for profiling a portion of the neural network graph 200 by choosing a certain granularity level and the location indicator. For example, profiling the neural network graph 200 may provide the total time delay for the operations 202-218 using the metadata 406. Next, a time delay for each of the operations 202-218 may be determined by using the single-step or break point debugging indicators, the granularity level and the location indicators accordingly. Thus, the user can use the time delays for one or more operations to identify that a particular operation (e.g., convolution operation 210 or the matrix multiplication operation 210c) of the neural network graph 200 has a time delay that exceeds a certain threshold. For example, the threshold may be based on an expected performance of the graph 200. The user can tune the neural network graph 200 by adjusting the weights, changing the order of the operations in the neural network graph 200, or other suitable criteria to improve the performance.

It will be noted that even though the annotated neural network graph 500 only illustrates TD as the metadata, other examples of the metadata in place of, or in addition to the TD are possible without deviating from the scope of the disclosed technologies. For example, in some cases, the metadata may include information associated with the instruction or operation under consideration, which can be beneficial to identify resource constraints or contention.

Figure 6:
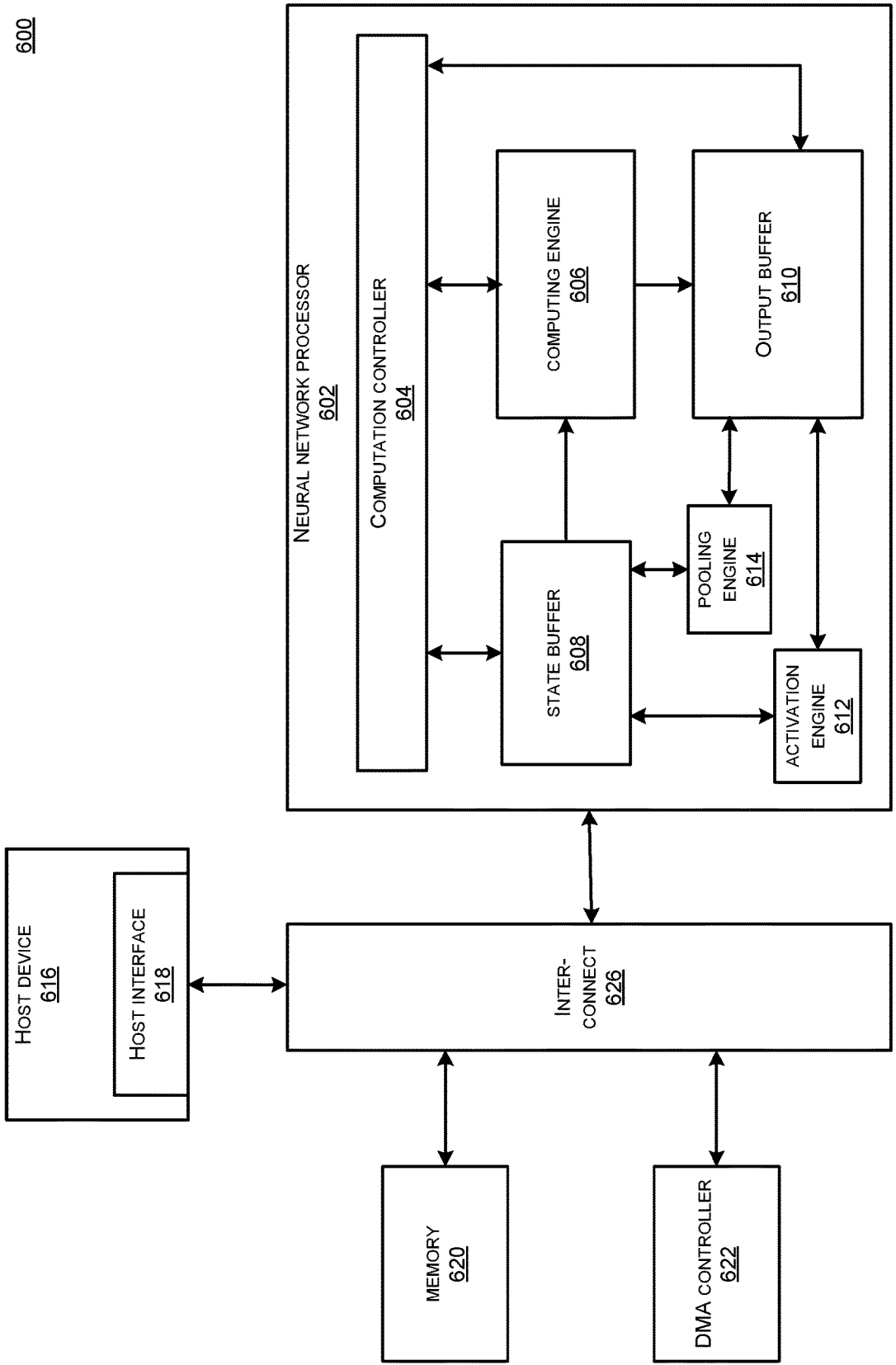
FIG. 6 shows an example apparatus for execution of neural network graphs according to some embodiments of the disclosed technologies.

FIG. 6 shows an example apparatus 600 for execution of neural network graphs according to some embodiments of the disclosed technologies. The apparatus 600 may be part of the remote server computer 108. The apparatus 600 may include a neural network processor 602 coupled to a host interface 618, memory 620, and a direct memory access (DMA) controller 622 via an interconnect 626. The interconnect 626 may be an AXI interface or any suitable interface. The neural network processor 602 along with some other components of the apparatus 600 may be part of the execution engine 110 in FIG. 1.

The host interface 618 may be configured to enable communication between a host device 616 and other components of the apparatus 600. For example, the host interface 618 may be configured to transmit memory descriptors including the memory addresses of the stored data (e.g., input data sets, weights, results of computations, etc.) between the host device 616 and the neural network processor 602. The host interface 618 may include, e.g., a peripheral component interconnect express (PCIe) interface, or any suitable interface for communicating with the host device 616.

The host device 616 may be configured to communicate with the client computer 102 via the network 116. The host device 616 may be configured to provide an image recognition service to identify certain objects (e.g., text, a person, a car, a house, etc.) from a given image. It is understood that the image recognition service is merely provided as an illustrative example, and that techniques disclosed herein can be used for other data processing applications including, for example, text-based data processing (e.g., processing of search queries), audio data processing, video data processing, etc.

The apparatus 600 can be part of a multi-tenant compute service system that can be used by multiple clients or organizations to run instances, such as virtual machine instances or bare-metal instances (e.g., operating systems that run directly on the server hardware). In most cases, instances, such as bare-metal or virtual machine instances, in a multi-tenant compute service system may be allocated to a client when the client needs them and decommissioned when they are no longer needed, such that the resources can be reallocated to other clients. The term "instance" may refer to, for example, an instance that is executed directly on server hardware or as a virtual machine. Different types of instances generally correspond to different hardware functions and/or arrangements of hardware (e.g., different amounts of available memory and/or processing hardware).

In some examples, the client can send the request message 104 to access a neural network graph executing on the remote server computer 108. The client can be executing on the client computer 102 or in a virtual machine on the remote server computer 108. For example, a virtual machine may be allocated to a client when the client wants to use the image recognition service to identify an image. In one embodiment, the client may compile a particular neural network graph using the compile request 104a using the API 114. The compiled code for the neural network graph can be stored in the memory 620. In another embodiment, the client may compile the neural network graph locally and load the compiled code using the load request 104b using the API 114. The compiled code may include instructions that can be executed by the neural network processor 602 to perform an interference operation on an image. For example, the client may send the infer request 104c in the request message 104 using the API 114 to the remote server computer 108 to make a prediction about a pattern or an object in the given image.

The host device 616 may be configured to decode the request message 104 received from the client. For example, the host device 616 may determine whether the request corresponds to a load request or an inference request based on the load request 104b or the infer request 104c in FIG. 3 respectively. Furthermore, the host device 616 may determine that the infer request 104c includes a debug indicator, a profile indicator, a granularity level, or a location indicator for collecting the debugging or profiling data. The host device 616 may provide the debug indicator, the profile indicator, the granularity level, and the location indicator to the neural network processor 602 for collecting the debugging or profiling data based on the granularity level and the location indicator during the execution of the inference operation. In some examples, the host device 616 may use the convolution results provided by the neural network processor 602 for inferences or predictions about a pattern or an object from an input data set corresponding to the given image in the infer request 104c. The host device 616 may also use the debugging or profiling data collected by the neural network processor 602 for annotating it back into the original format of the neural network graph 200 provided to the remote server computer 108. The annotated data may be provided to the client in the response message 112 using the API 114.

The memory 620 may be configured to store instructions, input data sets (e.g., pixel data of an image), and the weights (e.g., weights corresponding to certain visual and/or non-visual features). For example, the memory 620 may store machine level instructions to be executed by the neural network processor 602 in the form of the compiled code. In one example, the compiled code may be stored in the memory 620 using the host interface 618. In another example, the memory 620 may store compiled code for the neural network graph which may have been compiled using an external compiler service. The memory 620 may also be configured to store outputs of the neural network processor 602 (e.g., one or more image recognition decisions on the input images in the form of output feature maps or data sets) that may be used by the host device 616 to make predictions about the input image. The memory 620 may further be configured to store metadata collected for debugging or profiling of various neural network graphs executed by the neural network processor 602. For example, the memory 620 may store the metadata 402-408 for the neural network graph 200. The memory 620 may include any suitable memory, e.g., dynamic random access memory (DRAM), synchronous DRAM (SDRAM), double data rate DRAM (DDR DRAM), storage class memory (SCM), flash memory, etc.

The DMA controller 622 may be configured to perform DMA operations to transfer data between the neural network processor 602 and the host device 616. As discussed above, in some examples, the host device 616 can store the instructions, input data sets, and the weights in the memory 620. The host device 616 can provide the memory addresses for the stored instructions, data, and the weights to the neural network processor 602 (e.g., in the form of memory descriptors). The neural network processor 602 can then obtain the stored instructions, data, and the weights based on the memory addresses provided by the host device 616. The neural network processor 602 can also store the results of computations (e.g., one or more image recognition decisions) in the memory 620, and provide the memory addresses for the stored results to the host device 616.

The neural network processor 602 may include a computation controller 604, a computing engine 606, a state buffer 608, an output buffer 610, an activation engine 612 and a pooling engine 614. The neural network processor 602 can provide the computing resources to support the computations for different convolution layers. The neural network processor 602 can obtain the instructions, input data sets, and the weights based on the memory addresses provided by the host device 616 using the host interface 618. The neural network processor 602 can also store the results of computations (e.g., one or more image recognition decisions for an inference operation), and the metadata associated with debugging or profiling of a portion of the neural network graph in the memory 620, and provide the memory addresses for the stored results to the host device 616. The neural network processor 602 may be implemented as a system on chip (SoC), a field programmable gate array (FPGA), or any suitable circuit.

The state buffer 608 may be configured to provide caching of data used for computations at the computing engine 606. The data cached at the state buffer 608 may include the input data sets and the weights acquired from the memory 620, as well as intermediate outputs of computations at the computing engine 606. The caching can reduce the effect of memory access bottleneck (e.g., caused by the latencies at the memory 620, the DMA controller 622, the interconnect 626, etc.) on the performance of the computing engine 606. The state buffer 608 may also be configured to store the debugging or profiling data based on the granularity level collected during the inference operation. The state buffer 608 can be an on-chip memory device and may include a static random access memory (SRAM) or any suitable memory.

The computation controller 604 may be configured to provide controls to various components of the neural network processor 602 to perform convolution computations. In some implementations, the computation controller 604 may read the instructions stored in the memory 620 and store them in an instruction buffer. In one example, the instructions may correspond to the compiled code for a neural net graph compiled or loaded using the API 114. For example, the instructions may include instructions corresponding to the operations 202-218 of the neural net graph 200 in FIG. 2. The computation controller 604 may decode the instructions and schedule execution of the instructions by the computing engine 606. For example, the computation controller 604 may decode the load weights instruction 210b from the state buffer 608 and may schedule loading of the weights into the computing engine 606. The computation controller 604 may also decode the load input data1 instruction 210b to read a set of input data elements from the state buffer 608 to shift into the computing engine 606. The computation controller 604 may next decode the matrix multiplication instruction 210c to schedule a matrix multiplication with given parameters using the input data1 and the weights. The computation controller 604 may continue to decode the instructions 210d, 210e, and so on to schedule the instructions to be executed by the computing engine 606.

The computation controller 604 may also be configured to collect metadata associated with the execution of one or more instructions by the computing engine 606 for the inference operation, which can be used for debugging or profiling of a portion of the neural network graph. For example, the metadata may include time spent in the execution of one or more instructions based on the granularity level. In some implementations, the computation controller 604 may record timestamps at the beginning and at the end of each instruction executed by the computing engine 606, which can be used to determine a time delay for one instruction or a set of instructions. The collected metadata may be stored in the state buffer 608 or another independent memory and can be read by the host device 616 via the host interface 618. In some implementations, the collected metadata may be copied to the memory 620 via the interconnect 626, which can be read by the host device 616 via the host interface 618.

The computing engine 606 may be configured to perform computations for different operations of the neural network. In some embodiments, the computing engine 606 may include a systolic array comprising a set of processing elements (PEs) configured to perform one or more arithmetic operations involved in the neural network computations. For example, each PE may include arithmetic units such as a multiplier and an adder, or a fused multiplier adder. Each PE may perform matrix multiplication and matrix convolution using input data sets and associated weights. The computing engine 606 may execute instructions as scheduled by the computation controller 604 to load weights and the input data sets from the state buffer 608 into the computing engine 606. Each PE in the computing engine 606 may perform matrix multiplication of the input data sets and the weights. In some examples, the input data set elements may correspond to a tile or a patch of an input data set corresponding to the image to be convolved with a weight value. The computing engine 606 may provide the computation results to be stored in the output buffer 610.

The output buffer 610 may include a set of registers to store the output data sets generated by the computing engine 606. The output buffer 610 may also enable additional processing such as a pooling operation to reduce the size of the stored outputs. In some implementations, the computing engine 606 can be operated to perform computations for a particular convolution layer, and the output buffer 610 can process the outputs of that convolution layer and store the processed output data sets (with or without processing by the pooling engine 614 or the activation engine 612) at the state buffer 608.

The activation engine 612 may be configured to apply one or more activation functions (e.g., ReLu function) on the output of the output buffer 610. For example, the activation engine 612 may include one or more lookup tables (e.g., in the form of multiplexer circuits) that can map the input to one of the candidate outputs representing the result of applying the activation function to the input. In some examples, the activation engine 612 may also include a bypass path to allow outputs from the output buffer 610 to be stored directly at the state buffer 608 when the activation functions is not to be applied.

The pooling engine 614 may be configured to perform pooling operations on the data sets. The pooling operation may include down sampling using a non-linear function. The pooling operation may include mean, average, or maximum pooling to reduce the spatial dimensions. The pooling engine 614 may write the output data sets generated as a result of the pooling operations to the state buffer 608.

Figure 7:
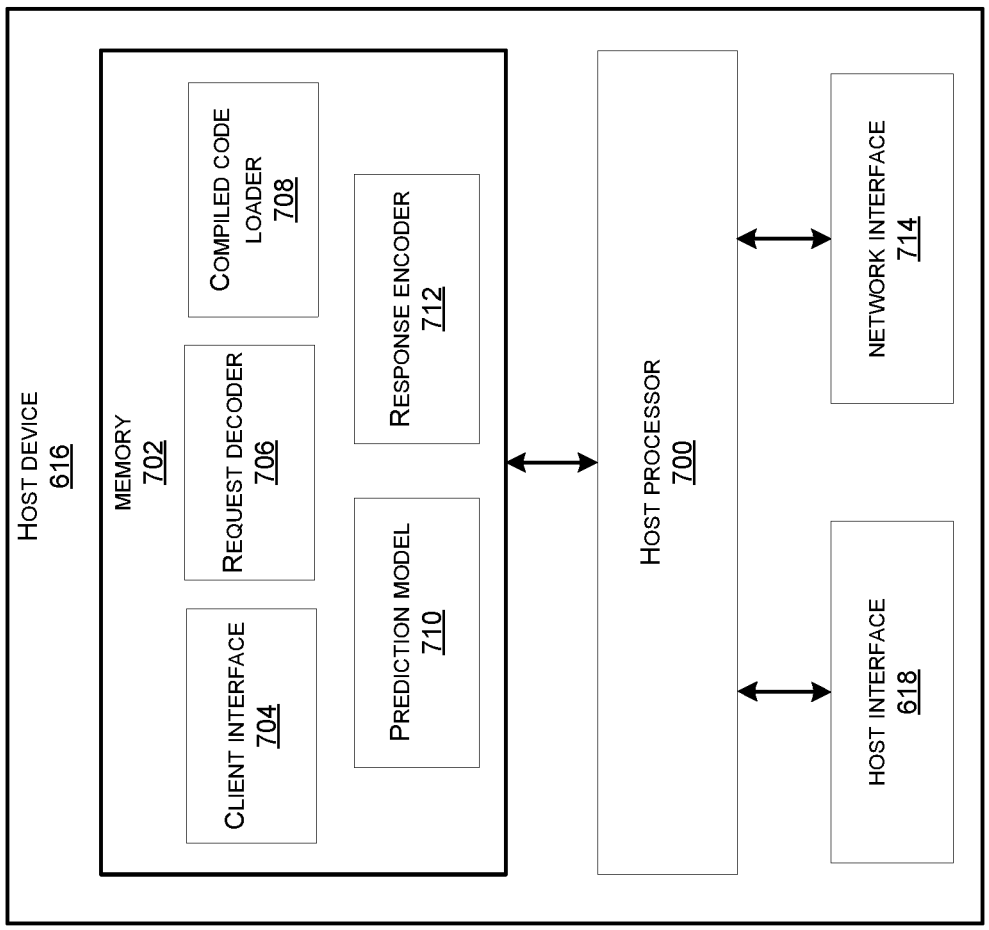
FIG. 7 shows an example block diagram for a host device in certain embodiments of the disclosed technologies.

FIG. 7 shows an example block diagram for the host device 616 in certain embodiments of the disclosed technologies. The host device 616 may include a host processor 700 coupled to a memory 702, a network interface 714, and the host interface 618. Note that the host device 616 may include additional or different components than shown in FIG. 7 without deviating from the scope of the disclosed technologies.

The host processor 700 may include one or more processing cores configured to execute instructions stored in the memory 702. Some non-limiting examples of the host processor 700 may include processors developed by Intel®, ARM®, AMD®, etc. The memory 702 may include a client interface 704, a request decoder 706, a compiled code loader 708, a prediction model 710, and a response encoder 712.

The memory 702 may be an SRAM, a flash memory, an EEPROM, or any suitable memory that can be configured to store instructions that can be executed by the host processor 700. In some examples, the host processor 700 may be configured to execute one or more virtual machines for different clients.

The network interface 714 may be configured to allow communication with the client computer 102 via the network 116. The network interface 714 may include a pin, a port, a connector, or another suitable interface to connect to a network controller, a network interface card (NIC), or another suitable circuit which can provide network connectivity for the host device 616 based on a network protocol, e.g., Ethernet or Wi-Fi. In some examples, the network controller may be on the host motherboard or integrated with the host device 616.

The host interface 618 may be configured to allow communication between the host device 616 with other components of the remote server computer 108. In various examples, the host interface 618 may be used to communicate with the memory 620, the DMA controller 622, or the neural network processor 602. In some examples, the host interface 618 may include a PCIe interface.

The client interface 704 may provide an interface to communicate with the client using the API 114. The client may be executing on the client computer 102 or in a virtual machine on the host processor 700. In some implementations, a hypervisor (not shown) executing on the host processor 700 may be configured to manage a plurality of virtual machines (VMs) on the host device 616. The hypervisor, also referred to as a virtual machine manager (VMM), can emulate multiple virtual devices on a single physical device in a virtualized environment. The hypervisor may be implemented as a software layer or as code embedded in a firmware on the host device 616. The hypervisor may be a type-2 hypervisor (e.g., hosted hypervisor) or a type-1 hypervisor (e.g., bare-metal hypervisor), or any other suitable implementation. Each VM can run one or more independent operating systems and one or more clients (e.g., applications or processes) on the hardware resources of the host device 616. For example, the hypervisor may create and start a VM for a user requesting an access to a resource on the host device 616 using the API 114. The resource may include a hardware resource or a service (e.g., image recognition service) provided by the host device 616. In some examples, the hardware resource may include the neural network processor 602 coupled to the host processor 700 via a PCIe interface (e.g., the host interface 618). A client executing in a VM on the host processor 700 can send the request message 104 or receive the response message 112 using the API 114.

The request decoder 706 may be configured to decode the request message 104 received from the client using the API 114. In one example, the request decoder 706 may decode a load request 104b to load the compiled code for a neural network graph to run inferences. In another example, the request decoder 706 may decode an infer request 104c to make a prediction on a given image using the neural network graph. The request decoder 706 may be further configured to provide the indicators for debugging, profiling, granularity level and location for the infer request 104c to the neural network processor 602 so that the neural network processor 602 can collect the debugging or profiling data accordingly. In some implementations, different granularity levels may be specified for different operations. For example, a first granularity level may be specified to determine a time delay for the activation operation 212, and a second granularity level may be specified to determine the time delays for the instructions 210a-210e corresponding to the convolution operation 210. The indicators can be included in the request message 104 for the infer request 104c or can be part of the compiled code.

The compiled code loader 708 may be configured to load the compiled code into the memory 620 via the host interface 618. The compiled code may include instructions to be executed by the neural network processor 602. For example, the compiled code may include the instructions 210a-210e in FIG. 2. The compiled code may be generated using a compiler service or by the client using the compile request 104a. In some implementations, the compiled code may be loaded into a local memory of the host device 616 before storing the compiled code into the memory 620.

The prediction model 710 may be configured to make a prediction based on the results of the computations performed by the neural network processor 602 executing the instructions for the neural network graph provided by the client. The prediction model 710 may provide the inference result 410 based on the prediction. The prediction model 710 may be implemented using any suitable method within the scope of the disclosed technologies.

The response encoder 712 may be configured to generate the response message 112 including the metadata associated with the infer request 104c for debugging or profiling a portion of the neural network graph. In one example, the response encoder 712 may generate the response message 112 as shown in FIG. 4 that can include the inference result 410, and the metadata 402, 404, 406, or 408 indicating time delays for different execution steps based on corresponding granularity levels and locations. In another example, response encoder 712 may generate the response message 112 by annotating the corresponding metadata back into the original neural network graph provided by the client as shown in FIG. 5A or FIG. 5B.

Figure 8:
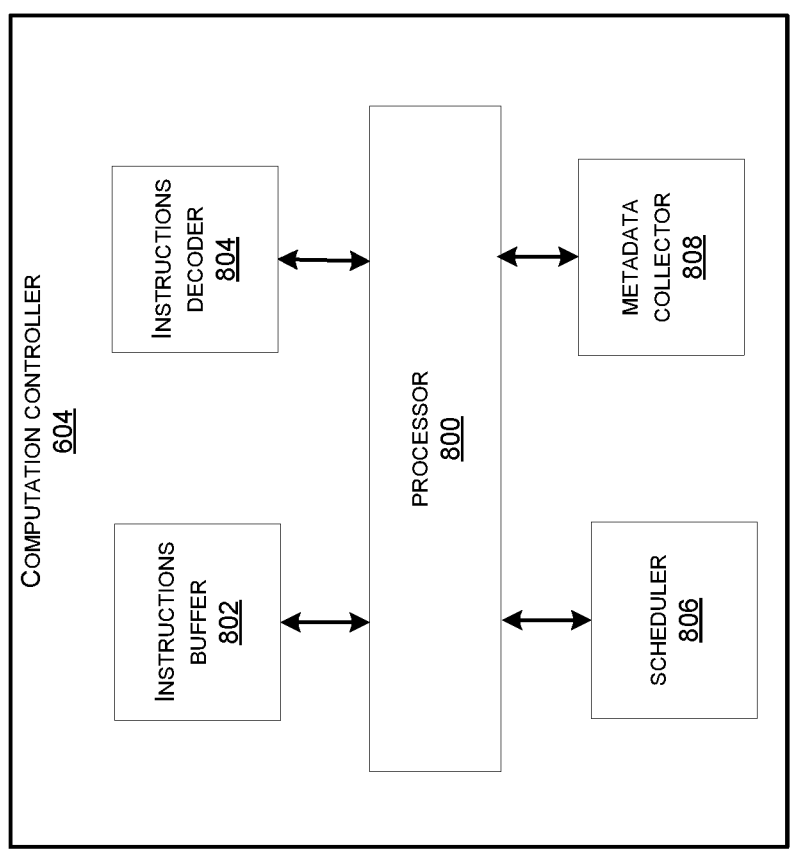
FIG. 8 shows an example block diagram for a computation controller in certain embodiments.

FIG. 8 shows an example block diagram for the computation controller 604 in certain embodiments of the disclosed technologies. The computation controller 604 may include a processor 800 coupled to an instruction buffer 802, an instruction decoder 804, a scheduler 806, and a metadata collector 808. The instruction buffer 802, instruction decoder 804, scheduler 806, or the metadata collector 808 can be implemented in software, hardware, or a combination thereof. Note that the computation controller 604 may include additional or different components than shown in FIG. 8 without deviating from the scope of the disclosed technologies. In some implementations, the computation controller 604 may be implemented using a microcontroller.

The instruction buffer 802 may be configured to store the instructions to be executed by the neural network processor 602. The instructions may be in the form of the compiled code for the neural network graph provided by the client computer 102. For example, the instructions may include the instructions 210a-210e. The instruction buffer 802 may receive the instructions from the memory 620 via the interconnect 626.

The instruction decoder 804 may be configured to decode the instructions stored in the instruction buffer 802. The instructions may include opcodes which may be decoded to determine a type of the instruction. For example, the instructions for the computation engine 806 may include instructions to load weights, load input data elements, matrix multiply, and other relevant operations.

The scheduler 806 may be configured to schedule execution of the instructions decoded by the instructions decoder 804. For example, for the instructions 210a-210e, the scheduler 806 may schedule execution of the instruction load input data1 210a in the computing engine 606 to load the next set of data elements from the state buffer 608. Next, the scheduler 806 may schedule execution of the instructions 210b and 210c to perform matrix multiplications. The scheduler 806 may then schedule execution of the instruction to load weights 210d in the computing engine 606 to load the next set of weights from the state buffer 608. Next, the scheduler 806 may schedule execution of the instruction 210e to perform matrix multiplication.

The metadata collector 808 may be configured to collect metadata associated with an operation executed on the neural network processor 602. The metadata may be similar to the metadata 402-408 as discussed with reference to FIG. 4. In some examples, the metadata collector 808 may collect metadata associated with the infer request 104c executed on the neural network processor 602 based on the indicators provided in the request message 104 for the infer request 104c. For example, for a debug request, the first indicator may include additional indicators to specify whether a step-by-step debugging data is requested, or data up to a certain step is requested. Similarly, for a profile request, based on the granularity level, metadata for a set of instructions may be collected. The metadata may include time delays for the one or more operations or instructions, and any other relevant information. In some implementations, a timestamp counter may count clock cycles starting at the hardware reset of the neural network processor 602. The timestamp may include a value of the timestamp counter at the execution of a given instruction. The metadata collector 808 may calculate time delays for one or more operations or instructions from the timestamps based on different indicators. Referring back to FIGS. 5A and 5B, in some examples, the metadata collector 808 may collect the metadata using timestamps stored for each instruction. The metadata collector 808 may calculate the time delays only for the operations or instructions under consideration based on the specified granularity level.

Figure 9:
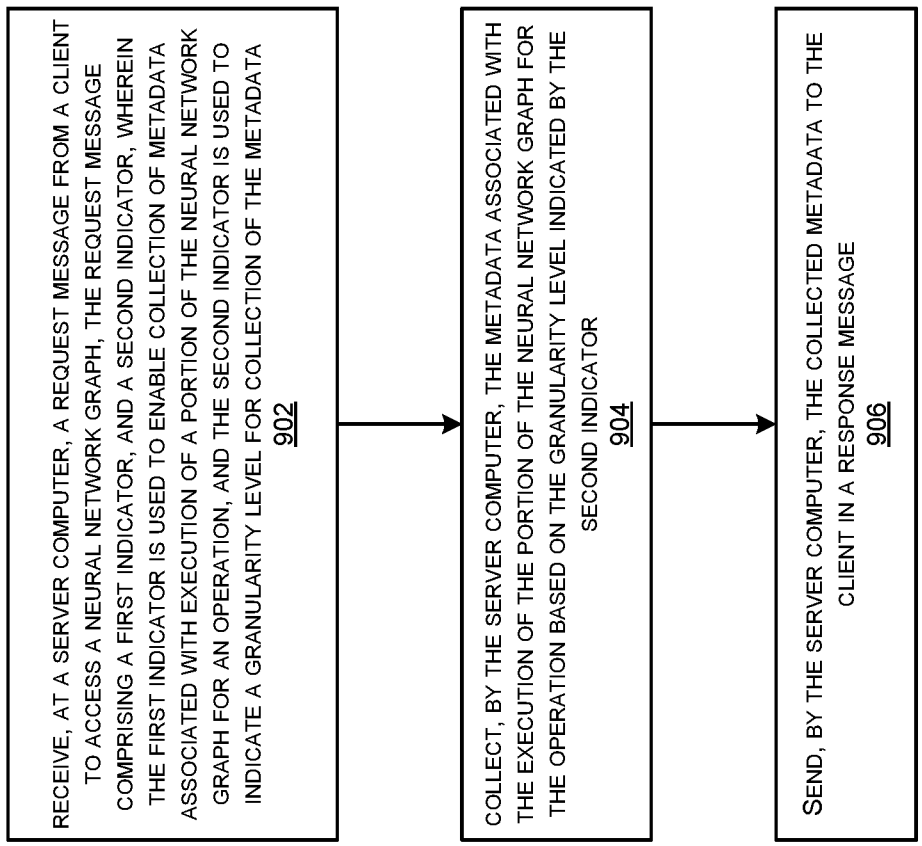
FIG. 9 shows a method executed by the remote server computer in accordance to certain embodiments of the disclosed technologies.

FIG. 9 shows a method executed by a server computer in accordance with certain embodiments of the disclosed technologies. For example, the server computer can be the remote server computer 108 in FIG. 1.

In a step 902, a server computer may receive a request message from a client to access a neural network graph. The request message may comprise a first indicator, and a second indicator. The first indicator may be used to enable collection of metadata associated with execution of a portion of the neural network graph for an operation, and the second indicator may be used to indicate a granularity level for collection of the metadata. As discussed with reference to FIG. 1, in one example, the remote server computer 108 may receive the request message 104 from a client executing on the client computer 102 via the network 116 to access a neural network graph executing on the remote server computer 108. In another example, the client may be executing in a virtual machine on the host processor 700. The neural network graph may be the neural network graph 200 in FIG. 2 executing on the neural network processor 602. The neural network graph 200 may include machine level instructions corresponding to the operations 202-218.

The request message 104 may include the infer request 104c to perform an inference operation on an image using the neural network graph 200. The infer request 104c may be received using the API 114. As discussed with reference to FIG. 3, the first indicator may be used to enable collection of metadata during the inference operation for a debug or a profile request. In some examples, the first indicator for a debug request may also be used to indicate a step-by-step debug request or setting of a break point. The second indicator may be used to indicate a granularity level for the collection of the metadata. For example, the granularity level may be used to indicate collection of metadata for a particular operation (e.g., the max pooling operation 218), all the instructions for a particular operation (e.g., the instructions 210a-210e for the convolution operation 210), a set of operations (e.g., the operations 212, 216, and 218) or all the operations of a particular type (e.g., the convolution operations 202, 204, and 210) for the neural network graph 200.

The neural network graph 200 may have been compiled by the client using the compile request 104a and loaded on the remote server computer 108 using the load request 104b using the API 114. As discussed with reference to FIG. 6, the compiled code for the neural network graph 200 may have been stored in the memory 620. The instructions may be copied or transferred from the memory 620 via the interconnect 626 to the instruction buffer 802 in FIG. 8 prior to starting the inference operation. The instructions may be decoded by the instruction decoder 804 and the scheduler 806 may schedule the execution of the instructions to be executed by the computing engine 606.

In a step 904, the server computer may collect the metadata associated with the execution of the portion of the neural network graph for the operation based on the granularity level indicated by the second indicator. The metadata collector 808 in the remote server computer 108 may collect the metadata associated with the execution of the portion of the neural network graph 200 for the inference operation based on the granularity level and the location indicators. The metadata may be similar to the metadata 402-408 in FIG. 4. For example, the metadata may include time delays associated with one or more operations or instructions under consideration, and any other relevant data.

In a step 906, the server computer may send the collected metadata to the client in a response message. The response encoder 712 may annotate the collected metadata into the neural network graph as shown in FIG. 5A or FIG. 5B based on the granularity level. The annotated neural network graph 500 may be sent to the client in the response message 112 using the API 114. The user can use the time delays provided in the annotated neural network graph 500 to determine long paths, less-optimal designs, or locations in which the graph is being blocked by resource contention or exhaustion. For example, the user can use the TD provided in the annotated neural network graph 500 to identify that the convolution operation 210 has a time delay TD that exceeds a certain threshold. The user can change the granularity level to request time delays TD1-TD5 for the instructions 210a-210e to identify the instruction which is exceeding its relative threshold in FIG. 5B. The user can tune the neural network graph 200 by adjusting the weights, changing the order of the operations in the neural network graph 200, rearrange the shape of the tensors, or other suitable criteria to improve the performance.

Thus, certain embodiments can utilize an in-band API (e.g., the API 114) for requesting the profiling or debugging data at different granularity levels and locations within the neural network graph, and for the conveyance of the profiling or debugging data which can be represented in the same format as used to represent the neural network graph. The in-band conveyance of this data can minimize expansion of additional APIs relative to out-of-band methods, and can ensure a more consistent execution path from the master engine to the remote execution engine and back. Furthermore, annotating the profiling or debugging data back into the original neural network graph provided by the user can allow the user to correlate the time delays with corresponding operations easily.

Figure 10:
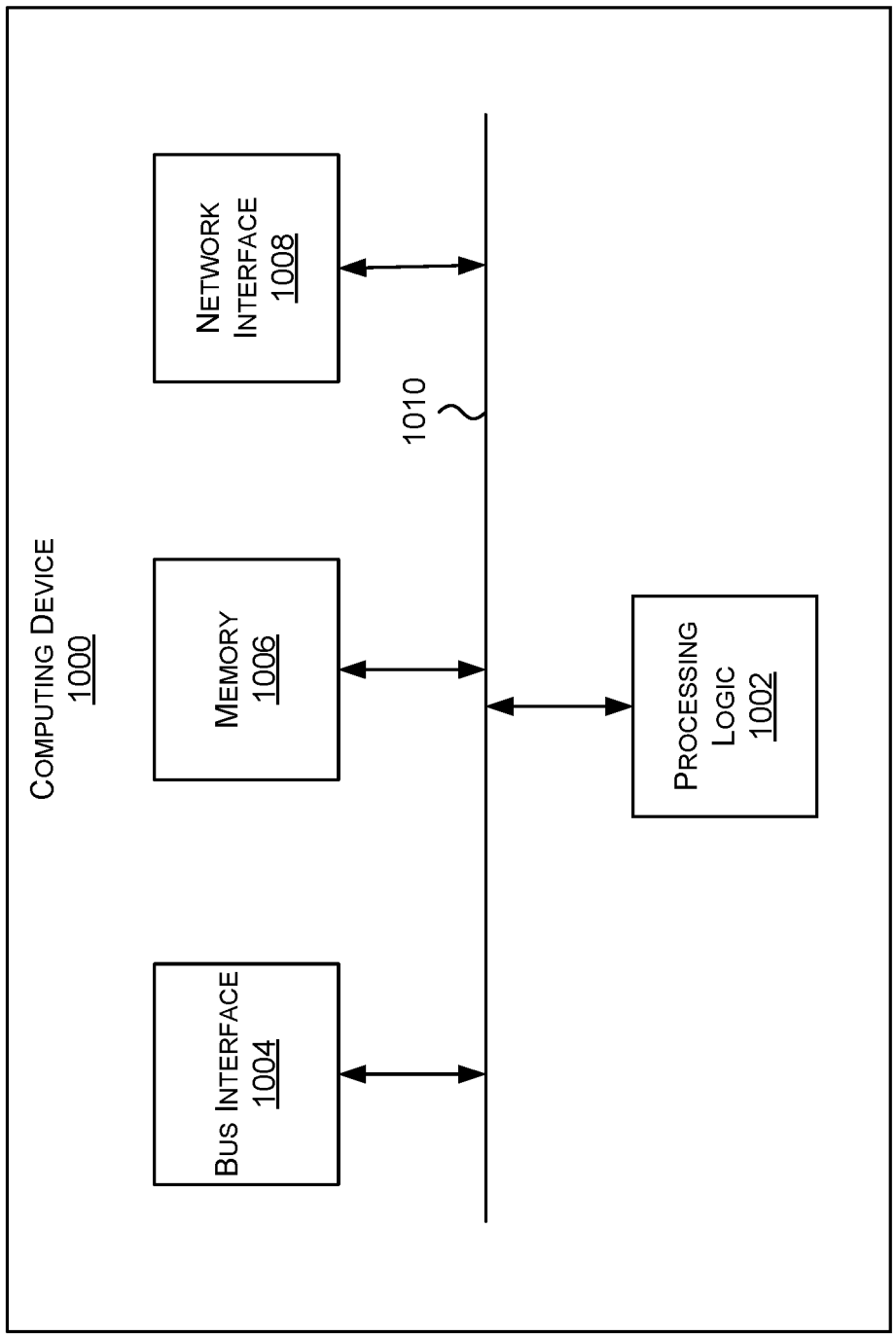
FIG. 10 illustrates an example of a computing device, according to certain aspects of the disclosure.

FIG. 10 illustrates an example of a computing device 1000. Functionality and/or several components of the computing device 1000 may be used without limitation with other embodiments disclosed elsewhere in this disclosure, without limitations. The computing device 1000 may perform computations to facilitate processing of a task. In some examples, the computing device 1000 can be part of the remote server computer 108 or the client computer 102 in FIG. 1. For example, functionality and/or several components of the computing device 1000 may be used without limitation in the remote server computer 108 or the client computer 102.

In one example, the computing device 1000 may include processing logic 1002, a bus interface 1004, memory 1006, and a network interface 1008. These components may be hardware modules, software modules, or a combination of hardware and software. In certain instances, components may be interchangeably used with modules or engines, without deviating from the scope of the disclosure. The computing device 1000 may include additional components, not illustrated here. In some implementations, the computing device 1000 may include fewer components. In some implementations, one or more of the components may be combined into one module. One or more of the components may be in communication with each other over a communication channel 1010. The communication channel 1010 may include one or more busses, meshes, matrices, fabrics, a combination of these communication channels, or some other suitable communication channel.

The processing logic 1002 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1002 may include processors developed by ARM®, MIPS®, AMD®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1002 may be stored on a computer-readable storage medium, for example, in the form of a computer program. The computer-readable storage medium may be non-transitory. In some cases, the computer-readable medium may be part of the memory 1006.

The memory 1006 may include either volatile or non-volatile, or both volatile and non-volatile types of memory. The memory 1006 may, for example, include random access memory (RAM), read only memory (ROM), Electrically Erasable Programmable Read-Only Memory (EEPROM), flash memory, and/or some other suitable storage media. In some cases, some or all of the memory 1006 may be internal to the computing device 1000, while in other cases some or all of the memory may be external to the computing device 1000. The memory 1006 may store an operating system comprising executable instructions that, when executed by the processing logic 1002, provides the execution environment for executing instructions providing data processing functionality for the computing device 1000. For example, the memory 1006 may include the memory 620, the state buffer 608, or the output buffer 610 in FIG. 6. In some examples, the memory 1006 may store software for a client configured to communicate with the remote server computer 108 for accessing neural network graphs executing on the remote server computer 108, as discussed with reference to FIG. 1.

The bus interface 1004 may enable communication with external entities, such as a host device and/or other components in a computing system, over an external communication medium. The bus interface 1004 may include a physical interface for connecting to a cable, socket, port, or other connection to the external communication medium. The bus interface 1004 may further include hardware and/or software to manage incoming and outgoing transactions. The bus interface 1004 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface 1004 may include the physical layer for any of these bus protocols, including a connector, power management, and error handling, among other things. In some implementations, the computing device 1000 may include multiple bus interface modules for communicating with multiple external entities. These multiple bus interface modules may implement the same local bus protocol, different local bus protocols, or a combination of the same and different bus protocols.

The network interface 1008 may include hardware and/or software for communicating with a network. This network interface 1008 may, for example, include physical connectors or physical ports for wired connection to a network, and/or antennas for wireless communication to a network. The network interface 1008 may further include hardware and/or software configured to implement a network protocol stack. The network interface 1008 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1000 may include multiple network interface modules, each configured to communicate with a different network. For example, in these implementations, the computing device 1000 may include a network interface module for communicating with a wired Ethernet network, a wireless 802.11 network, a cellular network, an Infiniband network, etc. In some embodiments, the computing device 1000 may communicate with the client server computer 102 via the network 116.

The various components and modules of the computing device 1000, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as image recognition, audio processing, video processing, pattern matching, search enquiries, etc. In some embodiments of the technology, the SoC or other component may include multiple subsystems as disclosed herein.

Figure 11:
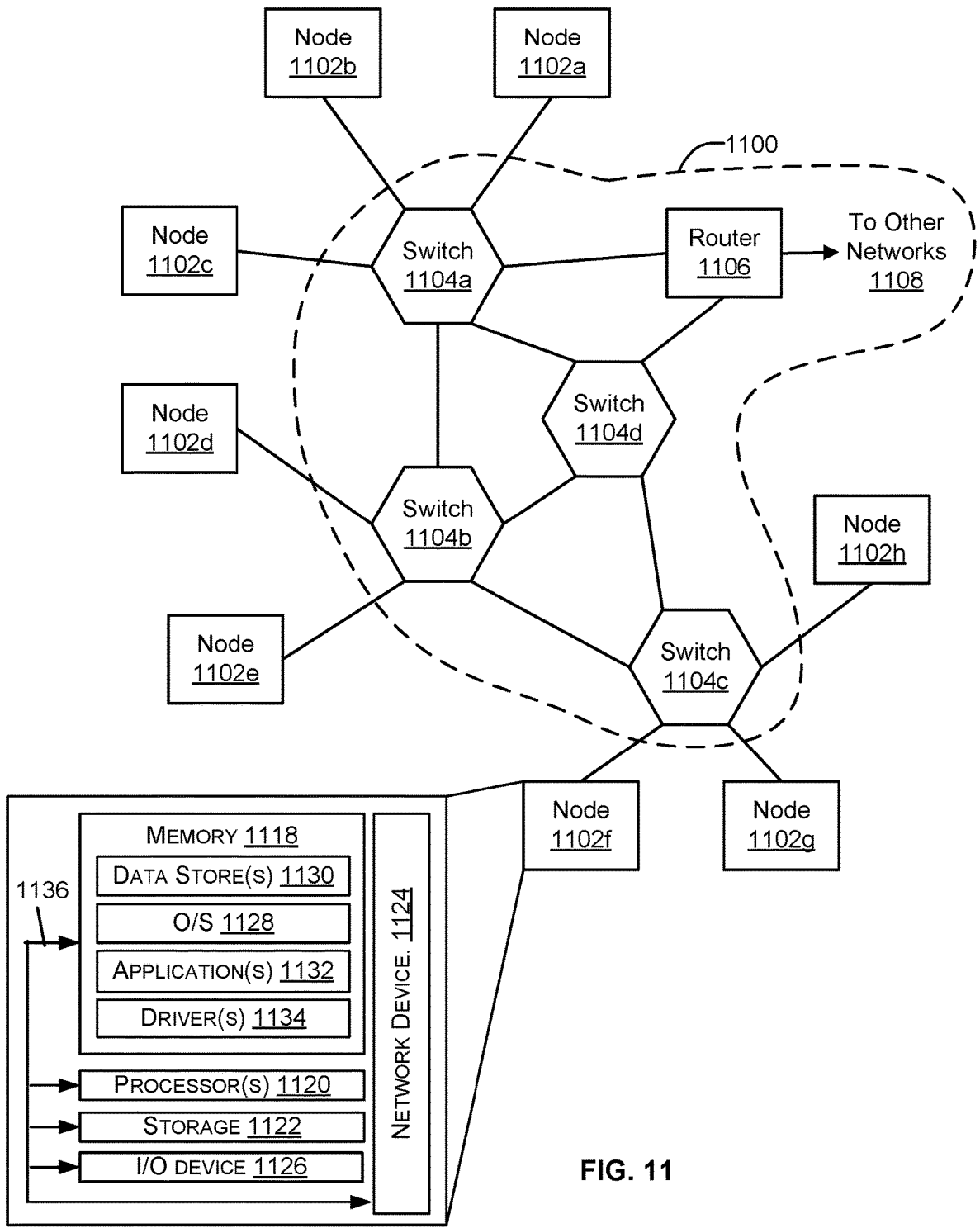
FIG. 11 illustrates an example architecture for features and systems described herein that includes one or more service provider computers and/or a user device connected via one or more networks, according to certain aspects of the disclosure.

FIG. 11 illustrates a network 1100, illustrating various different types of devices, such as nodes comprising the network device, switches and routers. In certain embodiments, the network 1100 may be based on a switched architecture with point-to-point links. As illustrated in FIG. 11, the network 1100 includes a plurality of switches 1104a-1104d, which may be arranged in a network. In some cases, the switches are arranged in a multi-layered network, such as a Clos network. A network device 1000 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1104a-1104d may be connected to a plurality of nodes 1102a-1102h and provide multiple paths between any two nodes.

The network 1100 may also include one or more network devices 1000 for connection with other networks 1108, such as other subnets, LANs, wide area networks (WANs), or the Internet, and may be referred to as routers 1106. Routers use headers and forwarding tables to determine the best path for forwarding the packets, and use protocols such as internet control message protocol (ICMP) to communicate with each other and configure the best route between any two devices.

In some examples, network(s) 1100 may include any one or a combination of many different types of networks, such as cable networks, the Internet, wireless networks, cellular networks and other private and/or public networks. Interconnected switches 1104a-1104d and router 1106, if present, may be referred to as a switch fabric, a fabric, a network fabric, or simply a network. In the context of a computer network, terms "fabric" and "network" may be used interchangeably herein.

Nodes 1102a-1102h may be any combination of host systems, processor nodes, storage subsystems, and I/O chassis that represent user devices, service provider computers or third party computers. For example, the nodes 1102a-1102h may include the client computer 102 or the remote server computer 108, which may communicate with one another using the API 114 for debugging or profiling of neural network graphs executing on the remote server computer 108.

User devices may include computing devices to access an application 1132 (e.g., a web browser or mobile device application). In some aspects, the application 1132 may be hosted, managed, and/or provided by a computing resources service or service provider. For example, the application 1132 may allow the user(s) to interact with the service provider computer(s) to, for example, access web content (e.g., web pages, music, video, etc.) using the API 114. The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1108. Additionally, the user device(s) may be part of the distributed system managed by, controlled by, or otherwise part of the service provider computer(s) (e.g., a console device integrated with the service provider computers).

The node(s) of FIG. 11 may also represent one or more service provider computers). One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1132 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1102a-1102h may include at least one memory 1118 and one or more processing units (or processor(s) 1120). The processor(s) 1120 may be implemented in hardware, computer-executable instructions, firmware, or combinations thereof. Computer-executable instruction or firmware implementations of the processor(s) 1120 may include computer-executable or machine-executable instructions written in any suitable programming language to perform the various functions described.

In some instances, the hardware processor(s) 1120 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1118 may store program instructions that are loadable and executable on the processor(s) 1120, as well as data generated during the execution of these programs. Depending on the configuration and type of the node(s) 1102a-1102h, the memory 1118 may be volatile (such as RAM) and/or non-volatile (such as ROM, flash memory, etc.). The memory 1118 may include an operating system 1128, one or more data stores 1130, one or more application programs 1132, one or more drivers 1134, and/or services for implementing the features disclosed herein. In various examples, the memory 1118 may include the memory 620, the state buffer 608, or the output buffer 610.

The operating system 1128 may support nodes 1102a-1102h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1128 may also be a proprietary operating system.

The data stores 1130 may include permanent or transitory data used and/or operated on by the operating system 1128, application programs 1132, or drivers 1134. Examples of such data include web pages, video data, audio data, images, user data, and so on. The information in the data stores 1130 may, in some implementations, be provided over the network(s) 1108 to user devices 1104. In some cases, the data stores 1130 may additionally or alternatively include stored application programs and/or drivers. Alternatively or additionally, the data stores 1130 may store standard and/or proprietary software libraries, and/or standard and/or proprietary application user interface (API) libraries. Information stored in the data stores 1130 may be machine-readable object code, source code, interpreted code, or intermediate code.

The drivers 1134 include programs that may provide communication between components in a node. For example, some drivers 1134 may provide communication between the operating system 1128 and additional storage 1122, network device 1124, and/or I/O device 1126. Alternatively or additionally, some drivers 1134 may provide communication between application programs 1132 and the operating system 1128, and/or application programs 1132 and peripheral devices accessible to the service provider computer. In many cases, the drivers 1134 may include drivers that provide well-understood functionality (e.g., printer drivers, display drivers, hard disk drivers, Solid State Device drivers). In other cases, the drivers 1134 may provide proprietary or specialized functionality.

The service provider computer(s) or servers may also include additional storage 1122, which may include removable storage and/or non-removable storage. The additional storage 1122 may include magnetic storage, optical disks, solid state disks, flash memory, and/or tape storage. The additional storage 1122 may be housed in the same chassis as the node(s) 1102a-1102h or may be in an external enclosure. The memory 1118 and/or additional storage 1122 and their associated computer-readable media may provide non-volatile storage of computer-readable instructions, data structures, program modules, and other data for the computing devices. In some implementations, the memory 1118 may include multiple different types of memory, such as SRAM, DRAM, or ROM.

The memory 1118 and the additional storage 1122, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1118 and the additional storage 1122 are examples of computer storage media. Additional types of computer storage media that may be present in the node(s) 1102a-1102h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1102a-1102h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1102a-1102h may also include I/O device(s) 1126, such as a keyboard, a mouse, a pen, a voice input device, a touch input device, a display, speakers, a printer, and the like. The node(s) 1102a-1102h may also include one or more communication channels 1136. A communication channel 1136 may provide a medium over which the various components of the node(s) 1102a-1102h can communicate. The communication channel or channels 1136 may take the form of a bus, a ring, a switching fabric, or a network.

The node(s) 1102a-1102h may also contain network device(s) 1124 that allow the node(s) 1102a-1102h to communicate with a stored database, another computing device or server, user terminals and/or other devices on the network(s) 1100. In some examples, the network 116 may be part of the network(s) 1100.

In some implementations, the network device 1124 is a peripheral device, such as a PCI-based device. In these implementations, the network device 1124 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1008 may implement NVMe, and the network device 1124 may be connected to a computing system using a PCIe interface.

A PCI-based device may include one or more functions. A "function" describes operations that may be provided by the network device 1124. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1124 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 10, FIG. 11, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A server computer for executing a neural network graph, comprising:
  a host device configured to:
    store the neural network graph to be executed by a neural network processor coupled to the host device; and
    receive, using an application programming interface (API), a request message from a client computer for an inference operation to be performed by the neural network processor using the neural network graph, the request message received via a network, the request message comprising a first indicator and a second indicator, wherein the first indicator is used to enable collection of metadata during the inference operation for debugging or profiling a portion of the neural network graph, and the second indicator is used to indicate a granularity level for the collection of the metadata; and
  the neural network processor configured to:
    perform the inference operation using the neural network graph;
    collect the metadata during the inference operation based on the first indicator and the second indicator; and
    provide the collected metadata to the host device for sending to the client computer, wherein the host device further is configured to:
annotate the collected metadata into the neural network graph, based on the granularity level, to generate an annotated neural network graph; and
send, using the API, the annotated neural network graph to the client computer in a response message, wherein the annotated neural network graph is sent via the network.

2. The server computer of claim 1, wherein the neural network graph comprises a plurality of operations and wherein each operation from the plurality of operations corresponds to one or more instructions to be executed by the neural network processor.

3. The server computer of claim 2, wherein the collected metadata includes, based on the granularity level, timestamps associated with each instruction corresponding to one or more operations in the portion of the neural network graph.

4. The server computer of claim 1, wherein the request message further comprises a third indicator used to indicate a location in the neural network graph for collection of the metadata.

5. A method, comprising:
receiving, at a server computer using an application programming interface (API), a request message from a client computer to access a neural network graph of an artificial neural network, the request message comprising a first indicator and a second indicator, wherein the first indicator is used to enable collection of metadata associated with execution of the neural network graph for an operation, and wherein the second indicator is used to indicate a granularity level for collection of the metadata;
executing, by the server computer, the artificial neural network based on the neural network graph on a neural network processing integrated circuit;
collecting, by the server computer, the metadata representing performance of the neural network graph on the neural network processing integrated circuit based on the granularity level indicated by the second indicator; and
sending, by the server computer using the application programming interface (API), the collected metadata to the client computer in a response message, the collected metadata being usable for profiling or debugging the neural network graph.

6. The method of claim 5, wherein the response message includes the collected metadata annotated back into the neural network graph based on the granularity level.

7. The method of claim 5, wherein the first indicator is used to enable the collection of the metadata for debugging a portion of the neural network graph.

8. The method of claim 7, wherein the request message includes a third indicator for indicating a location of the portion of the neural network graph, and wherein the debugging includes single stepping or setting a breakpoint within the portion of the neural network graph using the third indicator.

9. The method of claim 5, wherein the first indicator is used to enable collection of the metadata for profiling a portion of the neural network graph.

10. The method of claim 5, the method further comprising, prior to receiving the request message from the client computer:
storing, at the server computer, compiled code for the neural network graph to be executed by a neural network processor in the server computer.

11. The method of claim 10, wherein the neural network graph includes a plurality of operations and the compiled code includes one or more instructions corresponding to each of the plurality of operations.

12. The method of claim 11, wherein the metadata includes a respective timestamp for the one or more instructions corresponding to each operation based on the granularity level.

13. The method of claim 12, wherein the response message includes a respective time delay value annotated back into a portion of the neural network graph for each operation based on the granularity level.

14. The method of claim 11, wherein the plurality of operations include a convolution operation, and wherein the one or more instructions corresponding to the convolution operation includes a matrix multiplication instruction.

15. The method of claim 5, wherein the operation includes an inference operation and the request message further comprises input data for an image for performing the inference operation.

16. The method of claim 5, wherein the client computer is executing in a virtual machine on a host processor in the server computer, and wherein the neural network processing integrated circuit coupled is to the host processor via a peripheral component interconnect express (PCIe) interface.

17. The method of claim 5, wherein the client computer is configured to communicate with the server computer via a network.

18. A system, comprising:
a server computer configured to:
receive, using an application programming interface (API), a request message for an inference operation to be performed by a neural network processor using a neural network graph of an artificial neural network, the request message received from a client computer, the request message comprising a first indicator and a second indicator, wherein the first indicator is used to enable collection of metadata during the inference operation for debugging or profiling a portion of the neural network graph, and wherein the second indicator is used to indicate a granularity level for collection of the metadata;
execute the artificial neural network to perform the inference operation of the neural network graph on the neural network processor;
collect the metadata representing performance of the neural network graph on the neural network processor based on the granularity level indicated by the second indicator; and
send, using the API, the collected metadata to the client computer in a response message, the collected metadata being usable for profiling or debugging the neural network graph.

19. The system of claim 18, wherein the neural network graph includes a plurality of operations, and wherein the metadata includes a respective timestamp for one or more operations in the portion of the neural network graph.

20. A non-transitory computer readable medium storing a program, wherein the program, when executed by one or more processors, causes the one or more processors to:
send, using an application programming interface (API), a request message to a server computer for an inference operation of an artificial neural network to be performed by a neural network processor using a neural network graph, the request message comprising a first indicator and a second indicator, wherein the first indicator is used to enable collection of metadata during the inference operation for debugging or profiling a portion of the neural network graph, and the second indicator is used to indicate a granularity level for collection of the metadata; and receive, using the API, the metadata collected during execution of the artificial neural network on the neural network processor in a response message from the server computer, the metadata representing performance of the neural network graph on the neural network processor for use in profiling or debugging the neural network graph.

21. The non-transitory computer readable medium of claim 20, wherein the one or more processors are part of a client computer configured to communicate with the server computer via a network.

22. The non-transitory computer readable medium of claim 20, wherein the program further causes the one or more processors to:

determine, based on a timestamp for the one or more operations of the neural network graph, whether a time delay value for execution of the portion of the neural network graph exceeds a certain threshold.

23. The non-transitory computer readable medium of claim 22, wherein the program further causes the one or more processors to:

adjust a plurality of operations in the neural network graph based on determining that the time delay value for execution of the portion of the neural network graph exceeds the certain threshold.

\* \* \* \* \*